United States Patent [19]

Kennel

[11] 4,258,578
[45] Mar. 31, 1981

[54] FLOATED, INTERNALLY GIMBALLED PLATFORM ASSEMBLY

[75] Inventor: John M. Kennel, Santa Ana, Calif.

[73] Assignee: The United States of America as represented by the Secretary of the Air Force, Washington, D.C.

[21] Appl. No.: 913,160

[22] Filed: Jun. 6, 1978

[51] Int. Cl.³ .................. G01C 19/20; F16M 11/12
[52] U.S. Cl. ..................... 74/5.34; 33/321; 33/327; 248/183; 248/184
[58] Field of Search .............. 74/5.34, 5.5; 73/504; 33/321, 327; 248/183, 184, 179

[56] References Cited

U.S. PATENT DOCUMENTS

| | | | |
|---|---|---|---|
| 2,853,287 | 9/1958 | Draper et al. | 264/1 |
| 2,896,455 | 7/1959 | Bishop et al. | 33/327 X |
| 2,949,785 | 8/1960 | Singleton et al. | 74/5.34 |
| 2,958,522 | 11/1960 | Slater | 74/5.34 X |
| 2,959,059 | 11/1960 | Jorgensen | 74/5.34 X |
| 3,163,039 | 12/1964 | Newman et al. | 73/178 |
| 3,296,872 | 1/1967 | Bosch et al. | 74/5.34 |

Primary Examiner—Rodney H. Bonck
Attorney, Agent, or Firm—Donald J. Singer; Arsen Tashjian

[57] ABSTRACT

The azimuth shaft of an internally gimballed, gyro-stabilized platform assembly is maintained rigid by keeping the uniquely structured inertial instrument-mounting components neutrally buoyant in a flotation liquid that is captive within a spherical shaped outermost gimbal member. Unlike the prior art, this internally gimballed, gyro-stabilized platform assembly can be used for precision, and high-"g", applications.

4 Claims, 3 Drawing Figures

FLOATED, INTERNALLY GIMBALLED PLATFORM ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a gyroscopically stabilized platform and, more particularly, to a floated, internally gimballed stable platform which, in combination with a rigid structure, is used to stabilize inertial instruments.

Internally gimballed, gyro-stabilized platforms are often more compact than the usual externally gimballed platforms. However, the principal difficulty of prior art internal gimbal systems or assemblies, such as will be shown and described later herein, is the tendency of the shaft, which couples elements of the platform (such as oppositely disposed tables) on which the inertial instruments are mounted, to bend under applied acceleration. The bending of this shaft, which is more specifically referred to as the "azimuth shaft", causes inertial instruments on one table to rotate with respect to those inertial instruments on the other table. The errors caused by this undesired relative rotation makes such systems or assemblies unsuited for precision, or high-"g", applications.

I have invented a unique internally gimballed platform assembly which obviates this bending and rotation problem that is inherent in the prior art; and, thereby, I have significantly advanced the state-of-the-art.

SUMMARY OF THE INVENTION

My invention pertains to an internally gimballed platform assembly wherein bending of the azimuth shaft is avoided by immersing the assembly in a fluid, preferably a liquid, and structuring the stable platform elements (such as the two tables hereinbefore referred to) such that these elements are neutrally buoyant in the flotation liquid.

Accordingly, the principal object of this invention is to teach the structure of this novel floated, internally gimballed platform assembly.

This principal object, as well as other related objects, of this invention will become readily apparent after a consideration of the description of the invention, together with reference to the Figures of the drawings.

FURTHER DISCUSSION OF THE PRIOR ART

Figure 1:
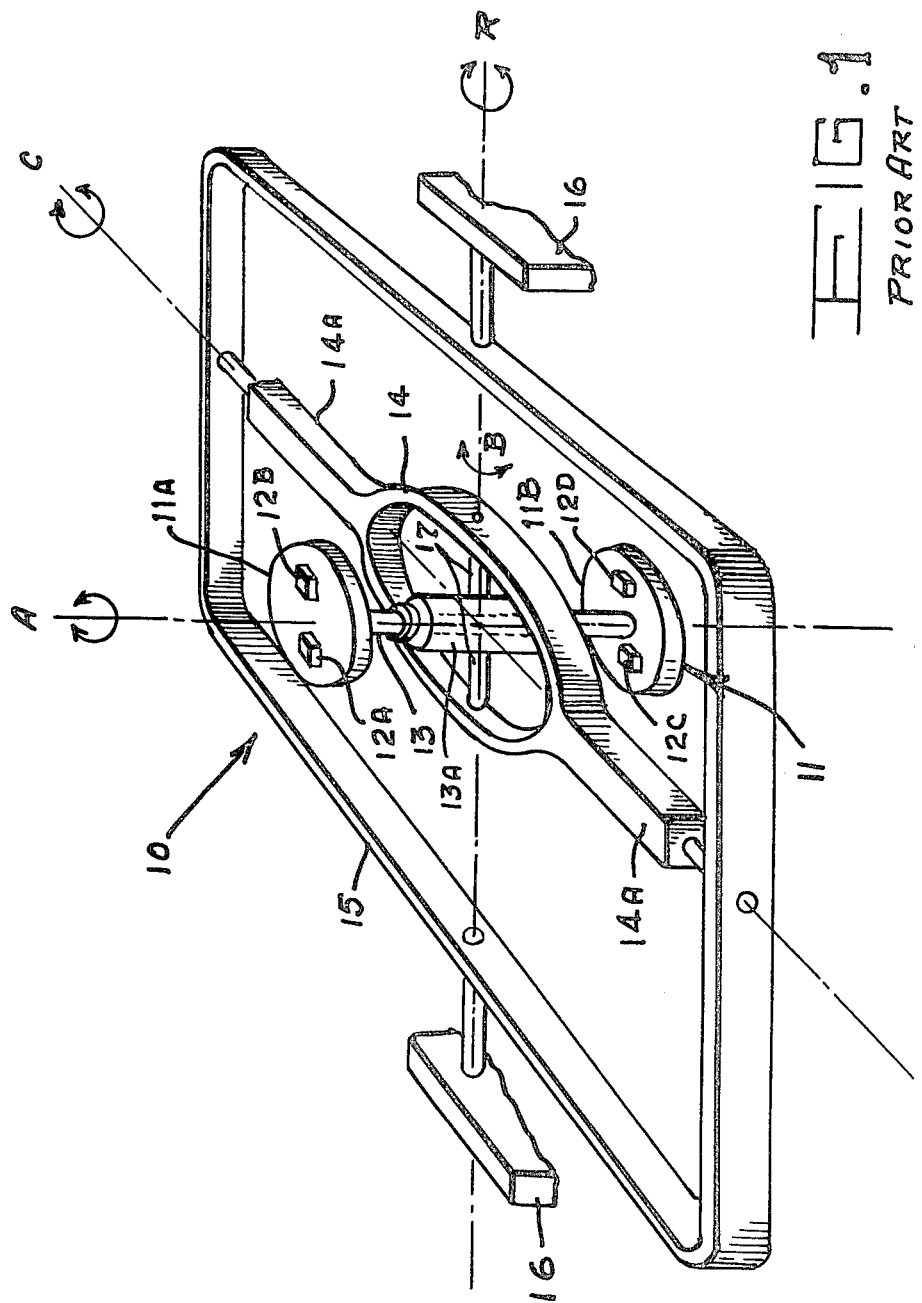
FIG. 1 is a perspective view, in simplified pictorial and schematic form, of a representative prior art internally gimballed, gyro-stabilized platform or assembly.

With reference to FIG. 1, therein is shown a conceptual illustration of a prior art internally gimballed system or assembly 10, previously referred to herein. There is a stable platform 11 which includes two tables 11A and 11B (i.e., stable elements or components of the stable platform) on which may be mounted a plurality of inertial instruments, such as 12A, 12B, 12C and 12D, as shown. The tables 11A and 11B are coupled by a shaft 13 (i.e., the azimuth shaft) which is free to rotate about the inner or "A" axis (i.e., the azimuth axis). The platform shaft bearing 13A is mounted in a yoke 14 (i.e., a gimbal member), and has limited rotational freedom about the "B" axis (i.e., around component 17). The yoke-shaft 14A is mounted in bearings in a gimbal ring 15, and forms the "C" axis. The gimbal ring 15 is mounted to a fixed structure 16, with bearings 90 degrees away from the "C" axis, in order to form the "R" axis and, thereby, to provide full freedom.

It is the bending of the azimuth shaft 13, because of applied acceleration, that causes the inertial instruments on one table to rotate with respect to those on the other table; and, therefore, makes this otherwise-satisfactory system unsuited for precision or high—"g" applications.

DESCRIPTION OF THE PREFERRED EMBODIMENT

Figure 2:
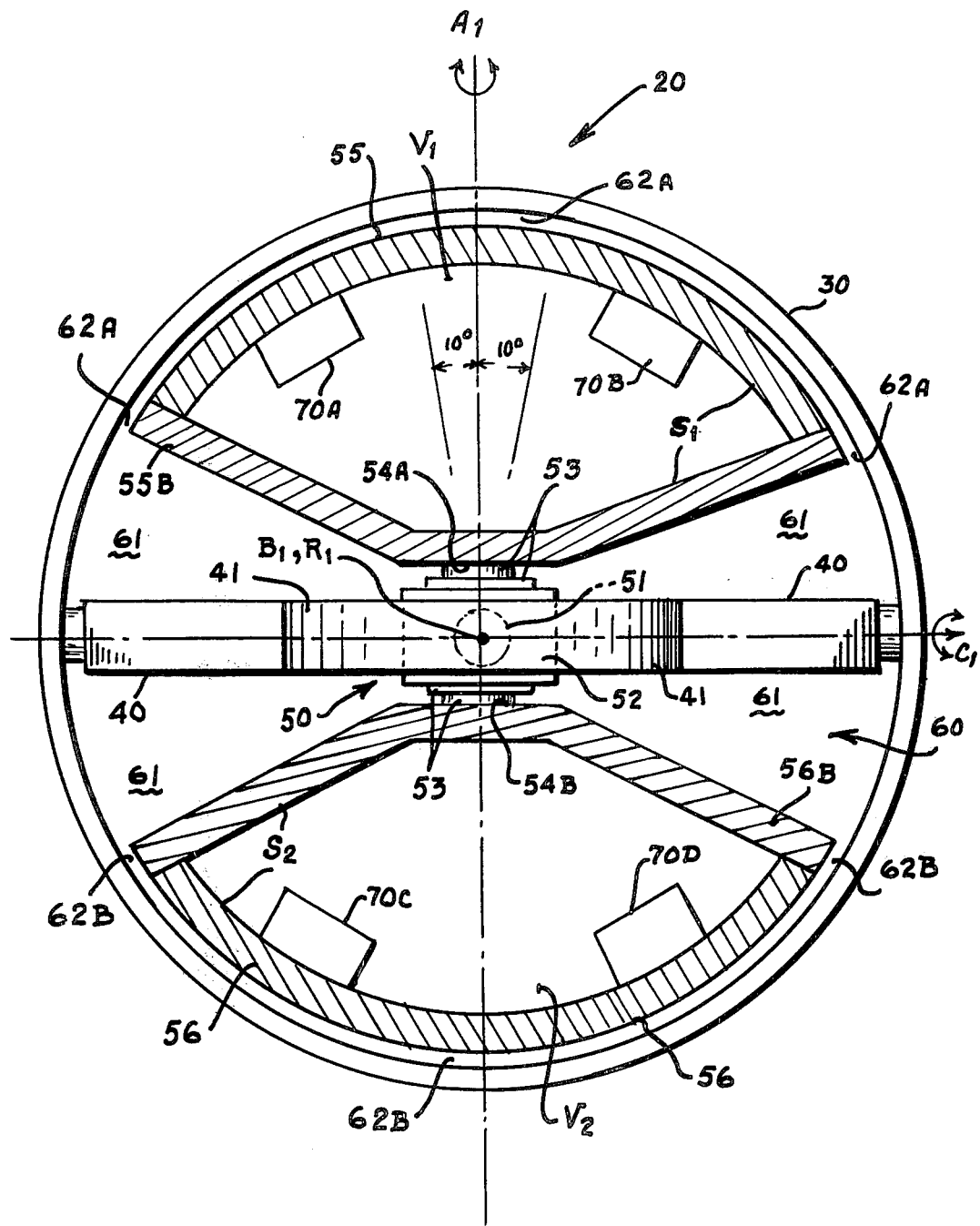
FIG. 2 is a perspective view, also in simplified pictorial and schematic form and partially in cross section, of a preferred embodiment of my invention.
Figure 3:
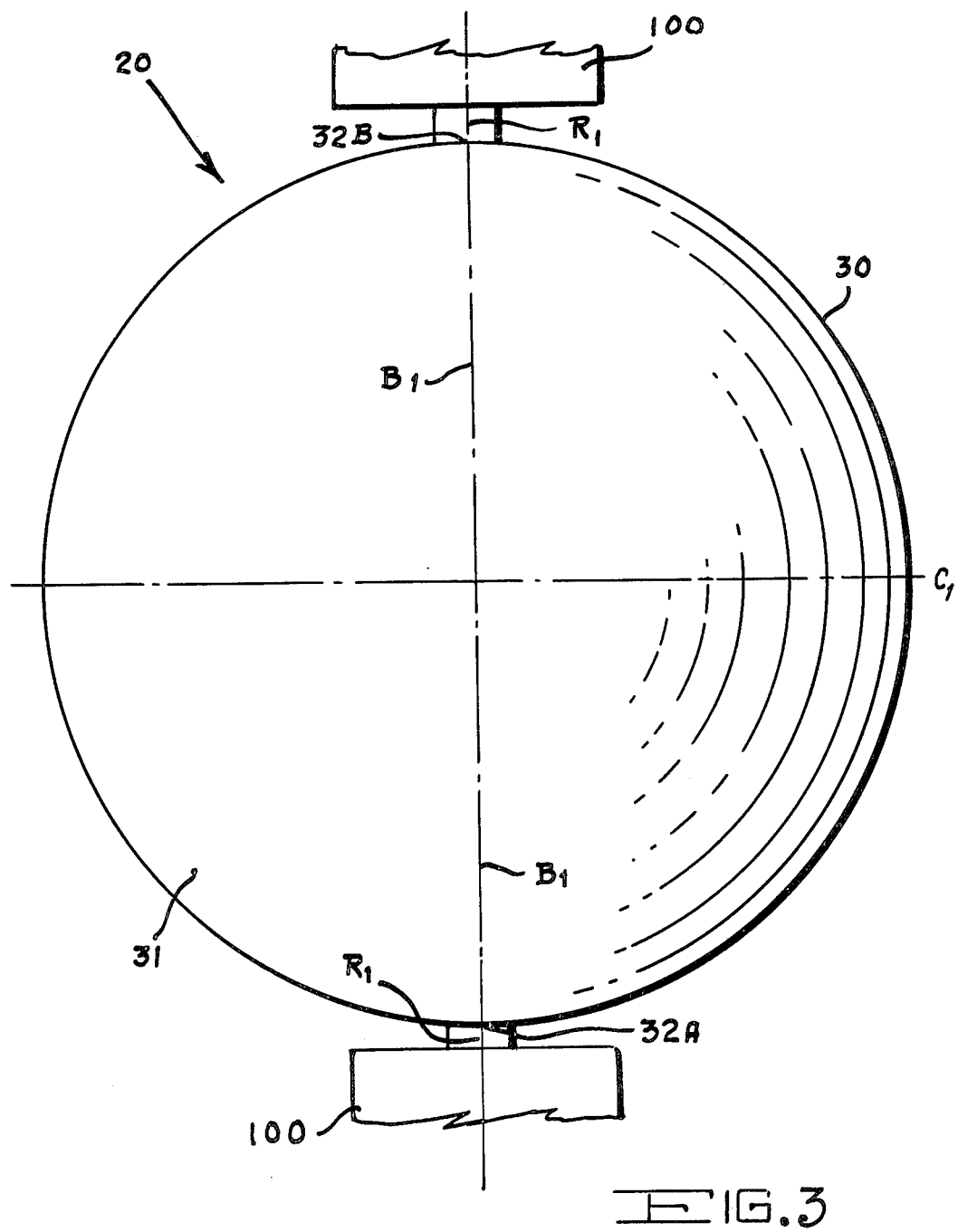
FIG. 3 is a top plan view, also in simplified pictorial and schematic form, of the preferred embodiment of my invention that is shown in FIG. 2.

With reference to FIGS. 2 and 3, therein is shown, in simplified form and in two views, a preferred embodiment 20 of my invention. In these two Figures, the same references numeral or other designation refers to the same component or the like.

In the most basic and generic structural form, my invention 20 comprises, in combination with a rigid structure 100: (a) an outermost first gimbal member 30 in the shape of a hollow sphere, made of fluid—impervious material (preferably beryllium), and having a diametric axis R1 by which this member 30 is rotatably secured to, and is mounted on, the rigid structure 100; (b) an inner second gimbal member 40, essentially in the shape of a yoke 41 (similar to 14, FIG. 1), that has a horizontal axis C1 that is perpendicular to, and is co-planar with, diametric axis R1 of gimbal member 30, and that is rotatably secured to and mounted on, the first gimbal member 30, such that this second gimbal member 40 is rotatable about its own axis C1; (c) a gimballed stable platform subassembly, generally designated 50, that is disposed internally of the first gimbal member 30 and directionally inward of the second gimbal member 40, and that has a vertical axis A1 (i.e., the azimuth axis) which is perpendicular to, and co-planar with, the horizontal axis R1 of the first gimbal member 30, and that is also perpendicular to, and co-planar with (although, of course, in a different plane than R1), the horizontal axis C1 of the second gimbal member 30, and that is rotatable around its vertical axis A1, and that also is pivotable around the horizontal axis R1 of the first gimbal member 30; and, (d) means, generally designated 60, for maintaining the stable platform subassembly in a floating, neutrally buoyant, and stabilized position.

More specifically, the first gimbal member 30 has an external surface 31 that is intersected at two diametrically opposed points thereon, such as 32A and 32B by the horizontal axis R1, and is rotatably secured to, and is mounted on, the rigid structure 100 at each of these two points 32A and 32B. The second gimbal member 40 is disposed internal of, and directionally inward of, the first gimbal member 30.

The gimballed stable platform subassembly 50 more specifically comprises: (a) a first component 51 (similar to element 17, FIG. 1) that has a horizontal axis B1 which is coincident with axis R1 of the first gimbal member 30, and that is pivotally mounted within the yoke-shaped second gimbal member 40; (b) a second component 52 that is connected to the first component 51, and that is mounted within the yoke-shaped second gimbal member 40, and that also is pivotable around the coincident axes R1 and B1 of, respectively, the first gimbal member 30 and the first component 51; (c) a third component 53 essentially in the shape of a shaft, connected to the second component 52, and having a first end 54A and a second end 54B, and with this third component 53 dimensioned, configured, and positioned such that it is rotatable around the vertical axis A1 of the platform subassembly 50, and also such that it is also limitedly pivotable around the horizontal axis R1 of the first gimbal member 30; (d) a fourth component 55 which is mounted at the first end 54A of the third component 53, and to which some of the inertial instruments, such as 70A and 70B may be mounted and stabilized; and, (e) a fifth component 56, similar to component 54, which is mounted at the second end 54B of the third component 53 and to which some other of the inertial instruments, such as 70C and 70D, may be mounted and stabilized.

The fourth component 55 further comprises a first spherical shell segment 55A made of fluid-impervious material, and a first truncated conical shell 55B also made of fluid-impervious material, that are joined to define and limit a first enclosed hollow volume V1 having an inside surface S1 to which, as previously stated, some of the inertial instruments (such as 70A and 70B) may be mounted. This fourth component 55 is disposed such that the first truncated conical shell 55B is adjacent to, is secured to, and is mounted on the first end 54A of the third component 53, and is also disposed such that the first spherical shell segment 55A is positioned concentric with the first gimbal member 30. A gap 62A is thereby formed between the first spherical shell segment 55A and the first gimbal member 30.

Similarly, the fifth conponent 56 further comprises a second spherical shell segment 56A made of fluid-impervious material, and a second truncated conical shell 56B also made of fluid-impervious material, that are joined to define and limit a second enclosed hollow volume V2 having an inside surface S2 to which, as also previously stated, the other of the inertial instruments (such as 70C and 70D) may be mounted. This fifth component 56 is disposed such that the second truncated conical shell 56B is adjacent to, is secured to, and is mounted on the second end 54B of the third component 53, and is also disposed such that the second spherical shell segment 56A is positioned concentric with the first gimbal member 30. Likewise, a gap 62B is thereby formed between the second spherical segment 56A and the first gimbal member 30.

The means, previously designated 60, for maintaining the stable platform subassembly 50 in a floating position, such as is shown in FIG. 2, whereby any bending moments on the third component 53 (i.e., the azimuth shaft) are eliminated, includes a flotation fluid 61, preferably a liquid fluorinated hydrocarbon, such as is designated commercially as FC-77, that fills, and is confined within (i.e., captivated), the first gimbal member 30.

It is to be noted that preferably the fourth component 55 and the fifth component 56 of the stable platform subassembly 50 are identical and, thereby, that the gaps 62A and 62B are also indentical.

It is also to be noted that, as a matter of preference, the third component 53 of the stable platform subassembly 50 is pivotable about the coincident horizontal axes R1 and B1 of, respectively, the first gimbal member 30 and the first component 51 of the stable platform subassembly 50 only approximately ten (10) degrees to either side of the vertical axis A1 (i.e., the azimuth axis) of the stable platform subassembly.

MANNER OF OPERATION OF THE PREFERRED EMBODIMENT

The manner of operation of the preferred embodiment 20, FIGS. 2 and 3, of my inventive floated, internally gimballed stable platform assembly can be very easily ascertained by any person of ordinary skill in the art from the foregoing description, coupled with reference to the Figures of the drawing.

For others, it is to be noted that, if the azimuth shaft, such as 53, FIG. 2, of the stable platform subassembly, such as 50, FIG. 2, can be prevented from bending in the presence of, and during the application of, acceleration force(s), the undesired resultant relative rotation of the elements, such as 55A and 56A (i.e., the first and the second spherical shell segments) on which, and to which, the inertial instrument, such as 70A, 70B, 70C, and 70D, are mounted is prevented. Then, as a result, the particular internally gimballed, gyro-stabilized platform can be used for precision, and high-"g", applications.

I prevent the azimuth shaft 53, FIG. 2, from bending, and thereby remain rigid, by structuring the components 55 and 56 uniquely, and then insuring, by the use of the captivated flotation liquid 61, that these components 55 and 56 remain neutrally buoyant. Stated another way, the buoyancy forces provided by the components 55 and 56 increase from a minimum at the shaft ends 54A and 54B to a maximum at the extreme outer enlarged portions (i.e., where 55A and liquid gap 62A are; and, where 56A and liquid gap 62B are). This results in not only an extremely stiff instrument-mounting structure, but also one in which the inertial forces which would tend to bend the asimuth shaft 53 (and thus cause substantial measurement errors), are counterbalanced by the support provided by the buoyancy forces mentioned above.

What is claimed is:

1. A floated, internally gimballed stable platform assembly, in combination with a rigid structure, for use in stabilizing a plurality of inertial instruments, comprising:
   a. an outermost first gimbal member in the shape of a hollow sphere, made of fluid-impervious material, having an external surface that is intersected at two diametrically opposed points thereon by a horizontal axis, wherein said first gimbal member is rotatably secured to, and is mounted on, said rigid structure at each of said two points, such that said first gimbal member is rotatable about its horizontal axis;
   b. an inner second gimbal member, essentially in the shape of a yoke, having a horizontal axis perpendicular to, and co-planar with, said horizontal axis of said first gimbal member, wherein said second gimbal member is disposed internal of, and directionally inward of, and is rotatably secured to and mounted on, said first gimbal member, such that said second gimbal member is rotatable about its own horizontal axis;
   c. a gimballed stable platform subassembly disposed internal of said first gimbal member and directionally inward of said second gimbal member, wherein said subassembly has a vertical axis that is perpendicular to, and co-planar with, said horizontal axis of said second gimbal member, and wherein said subassembly comprises:

(1) a first component having a horizontal axis coincident with said axis of said first gimbal member and pivotally mounted within said yoke-shaped second gimbal member;

(2) a second component connected to said first component, mounted within said yoke-shaped second gimbal member, and pivotable around said coincident axes of said first gimbal member and of said first component;

(3) a third component, essentially in the shape of a shaft, connected to said second component, and having a first end and a second end, wherein said third component is dimensioned, configured, and positioned such that it is rotatable around said vertical axis of said stable platform subassembly, and such that it is also pivotable around said horizontal axis of said first gimbal member;

(4) a fourth component which further comprises a first spherical shell segment made of fluid-impervious material, and a first truncated conical shell made of fluid-impervious material, that are joined to define and limit a first enclosed hollow volume having an inside surface to which some of said inertial instruments may be mounted, wherein said fourth component is disposed such that said first truncated conical shell is adjacent to, is secured to, and is mounted on said first end of said third component, and also such that said first spherical shell segment is positioned concentric with said first gimbal member, whereby a gap is formed between said first spherical shell segment and said first gimbal member;

(5) and, a fifth component which further comprises a second spherical shell segment made of fluid-impervious material, and a second truncated conical shell made of fluid-impervious material, that are joined to define and limit a second enclosed hollow volume having an inside surface to which some other of said inertial instruments may be mounted, wherein said fifth component is disposed such that said second truncated conical shell is adjacent to, is secured to, and is mounted on said second end of said third component, and also such that said second spherical shell segment is positioned concentric with said first gimbal member, whereby a gap is formed between said second spherical shell segment and said first gimbal member;

d. and, means for maintaining said stable platform subassembly in a floating position, whereby any bending moments on said third component of said stable platform subassembly are eliminated.

2. A floated, internally gimballed stable platform assembly, as set forth in claim 1, wherein said means for maintaining said stable platform subassembly in a floating position includes a flotation fluid that fills, and is confined within, said first gimbal member.

3. A floated, internally gimballed stable platform assembly, as set forth in claim 2, wherein said fourth component and said fifth component of said stable platform subassembly are identical.

4. A floated, internally gimballed stable platform assembly, as set forth in claim 3, wherein said third component of said stable platform subassembly is pivotable about said coincident horizontal axes of said first gimbal member and of said first component of said stable platform subassembly only approximately 10 degrees from said vertical axis of said stable platform subassembly.

* * * * *